Dec. 7, 1948.  C. H. KAMAN  2,455,866
AIRCRAFT OF ROTARY WING TYPE
Filed Aug. 19, 1946  8 Sheets-Sheet 1

INVENTOR.
CHARLES H. KAMAN
BY S. Jay Teller
ATTORNEY

Dec. 7, 1948.  C. H. KAMAN  2,455,866
AIRCRAFT OF ROTARY WING TYPE

Filed Aug. 19, 1946  8 Sheets-Sheet 2

Fig. 2

INVENTOR.
CHARLES H. KAMAN
BY S. Jay Teller
ATTORNEY

Dec. 7, 1948.                C. H. KAMAN                2,455,866
                      AIRCRAFT OF ROTARY WING TYPE
Filed Aug. 19, 1946                               8 Sheets-Sheet 3

Fig. 3

INVENTOR.
CHARLES H. KAMAN
BY S. Jay Teller
ATTORNEY

Dec. 7, 1948.  C. H. KAMAN  2,455,866
AIRCRAFT OF ROTARY WING TYPE
Filed Aug. 19, 1946  8 Sheets-Sheet 4

INVENTOR.
CHARLES H. KAMAN
BY S. Jay Teller
ATTORNEY

Dec. 7, 1948.  C. H. KAMAN  2,455,866
AIRCRAFT OF ROTARY WING TYPE
Filed Aug. 19, 1946  8 Sheets-Sheet 5

INVENTOR.
CHARLES H. KAMAN
BY S. Jay Teller
ATTORNEY

Dec. 7, 1948.  C. H. KAMAN  2,455,866
AIRCRAFT OF ROTARY WING TYPE
Filed Aug. 19, 1946  8 Sheets-Sheet 6

INVENTOR.
CHARLES H. KAMAN
BY
S. Jay Teller
ATTORNEY

Patented Dec. 7, 1948

2,455,866

UNITED STATES PATENT OFFICE 2,455,866

AIRCRAFT OF ROTARY WING TYPE

Charles H. Kaman, West Hartford, Conn., assignor to The Kaman Aircraft Corporation, West Hartford, Conn., a corporation of Connecticut Application August 19, 1946, Serial No. 691,431

12 Claims. (Cl. 244—17)

1

The invention is primarily useful in aircraft of the rotary wing type, such as Autogiros, helicopters, gyrodynes and the like. By way of illustration the invention wil be shown and described as incorporated in a helicopter, as to which it has particular advantages.

The invention relates particularly to means for modifying the effective pitches of the rotor blades. It has been the more usual prior practice to so connect the blades with the hub that they can be adjusted bodily about axes perpendicular to the axis of rotation and extending longitudinally of the blades. It has also been proposed alternatively to provide the blades with flaps which can be adjusted so that the aerodynamic actions of the flaps are added to or subtracted from those of the bades. One of the imtracted from those of the bades. One of the important objects of the present invention is to provide a rotor having resilient or torsionally actuated blades, the inner ends of which are relatively fixedly connected with the hub so that bodily rotation at the root is prevented about axes extending longitudinally of the blades and to provide flaps on the blades which are so designed, positioned and controlled that aerodynamic action thereon serves to twist the blades in opposition to their own resiliency so as to change the effective pitches thereof. This greatly simplifies the connection of the blades with the hub and eliminates the necessity for retention bearings and all associated problems of fatigue life and control friction, it makes possible the use of a much lighter and more easily handled control mechanism, and it has numerous other advantages which will be pointed out in detail. In a rotary wing aircraft, such as a helicopter, the adjustment of the flaps serves to control vertical and horizontal motion.

A further object of the invention is to provide a rotary wing aircraft wherein the rotor is pivotally movable relatively to the main vertical shaft about a horizontal axis and wherein there are flaps on the blades thereof which are adjusted during rotation to eliminate, or at least greatly reduce, the tendency of the rotor to oscillate about the said horizontal axis.

A still further object of the invention is to effect the last said automatic control of the rotor by utilizing the same flaps which are connected with the rotor blades to cause twisting thereof.

A still further object of the invention is to utilize the flaps connected with the blades to effect twisting thereof in such a manner as to minimize pendular oscillatory motion of a helicopter during hovering.

2

Other objects of the invention will be apparent from the drawings and from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Figure 1:
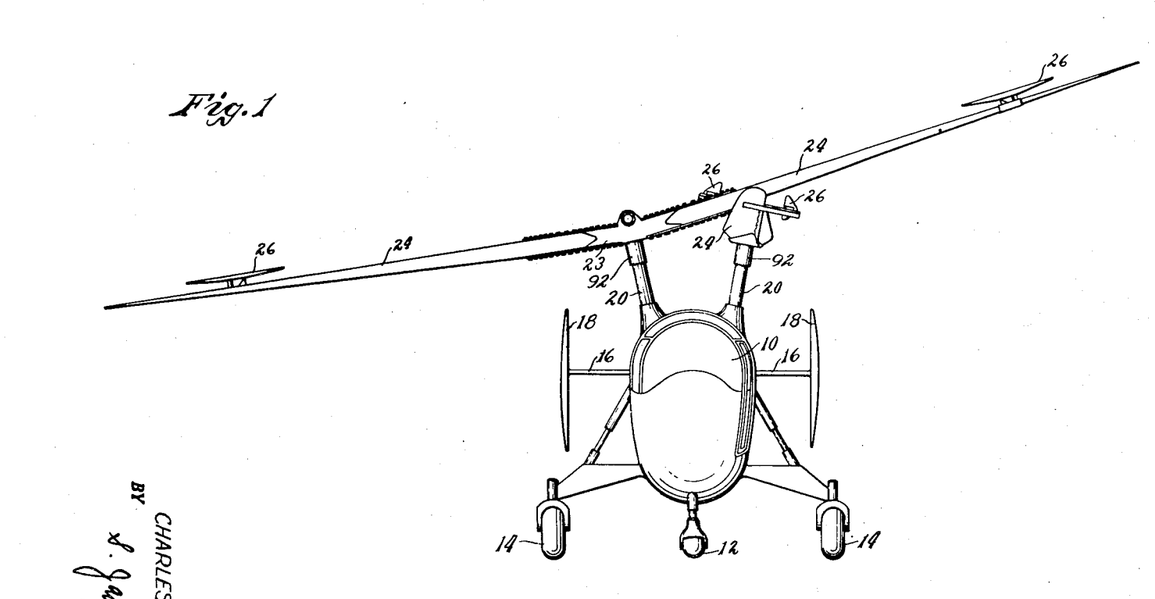
Fig. 1 is a front view of an aircraft having my invention incorporated therein.
Figure 2:
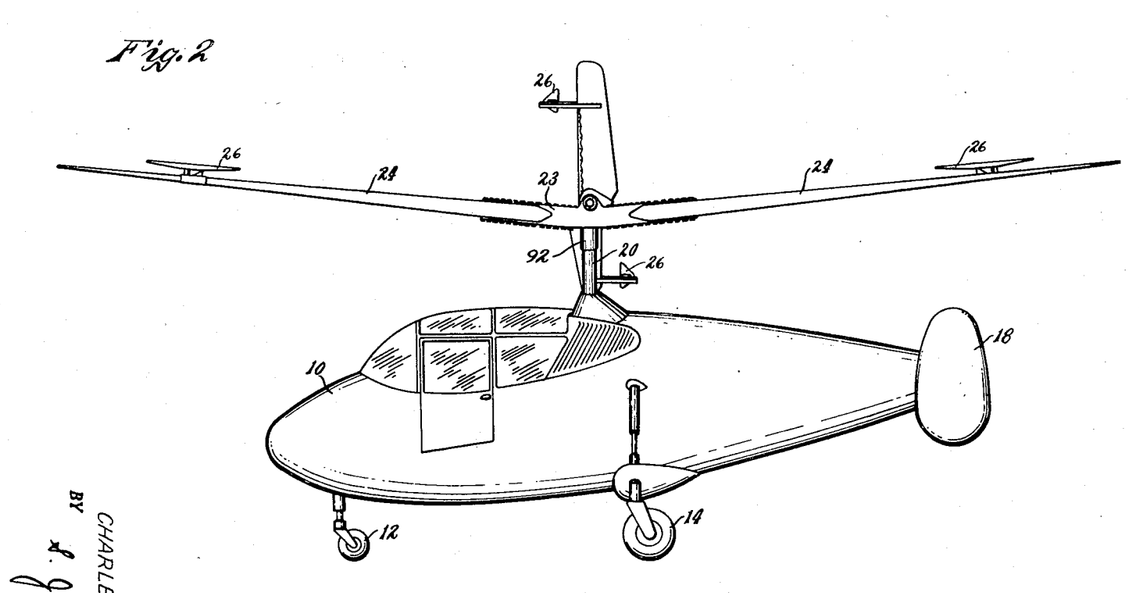
Fig. 2 is a left side view.
Figure 3:
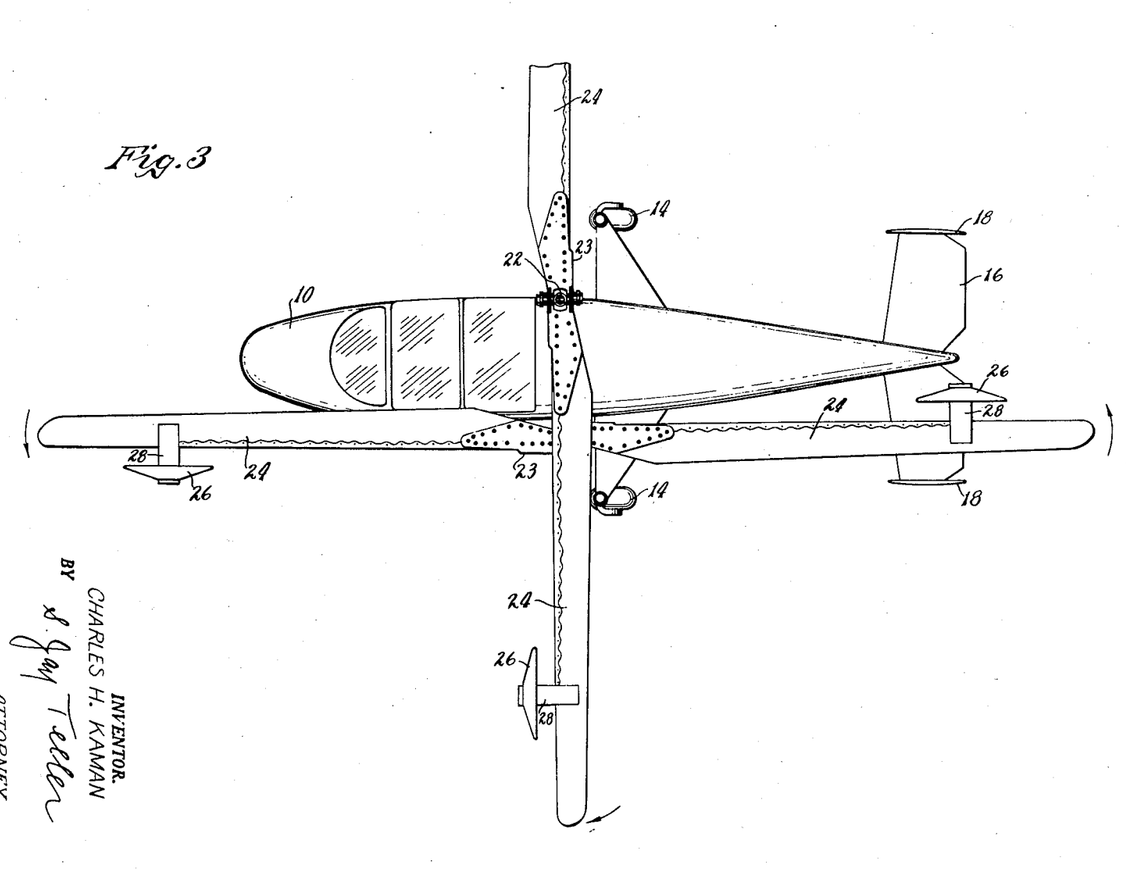
Fig. 3 is a plan view.
Figure 4:
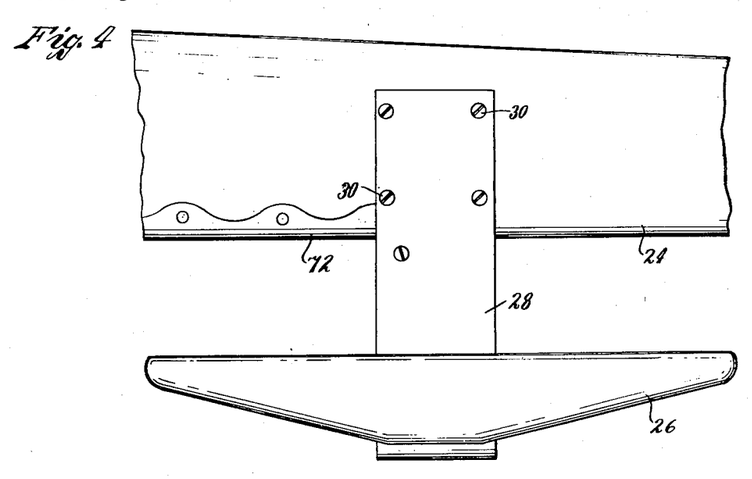
Fig. 4 is an enlarged plan view showing a portion of one of the wings and the adjustable flap carried thereby.

In Figs. 1 to 3 of the drawings I have shown an aircraft of the helicopter type having rotary wings and control mechanisms therefor which embody the invention. The structure of the helicopter may be widely varied and the particular structure shown is intended to be merely illustrative.

The helicopter as illustrated in the drawings comprises a fuselage 10 provided with landing wheels 12 and 14, 14. The fuselage may carry stabilizers 16, 16 having vertical fins 18, 18. Mounted within the fuselage is a suitable power plant which is not shown, as this does not of itself constitute any part of the present invention.

Rotatably mounted in suitable bearings in the fuselage is at least one substantially upright or vertical supporting and driving shaft 20. Secured to the shaft 20 at the upper end thereof is a hub 22 to which is connected a blade support 23 carrying a plurality of aerofoil blades 24, 24 which are uniformly spaced circumferentially. As shown, there are two blades 24, 24 connected with the support 23 and there are important advantages in the provision of only two blades as will presently appear. However, the invention as to some of its aspects is not limited to the use of only two blades and a larger number may be used.

Preferably there are two supporting and driving shafts 20 as shown in Fig. 1, each of them being provided with a hub 22 and with a blade support 23 connected with blades 24, 24. When there are two shafts and two rotors the shafts are preferably inclined and diverge upwardly as shown. The two shafts are connected by gearing or otherwise to the power plant so that they can be rotated thereby in synchronism but in opposite directions. The blades 24, 24 and the blade support 23 of one rotor are similar to the blades 24, 24 and the blade support 23 of the other rotor except that these parts are oppositely shaped to conform to the respective directions of rotation. As clearly shown in Fig. 3, the hubs and the blades are so connected with the respective shafts 20, 20 that the blades on one rotor are longitudinal when those on the other rotor are transverse. This arrangement, together with the diverging inclinations of the shafts 20, 20 enables the blades of the two rotors to clear each other as they are rotated. The rotation of the rotors in opposite directions avoids any tendency for the reactive forces to turn the aircraft, as these reactive forces, being in opposite directions, normally neutralize each other. Notwithstanding the inclinations of the shafts 20, 20 they will for convenience be referred to as "substantially vertical" and certain parts carried by the shafts will for convenience be referred to as "substantially horizontal."

By means of the common support 23 the blades 24, 24 of each rotor are relatively fixedly secured to the corresponding hub 22, that is, they are connected for bodily rotation with the hub but are rigidly held to prevent any relative rotative movements of the root portions thereof about axes extending longitudinally of the blades. The blades preferably have positive dihedral angles as shown.

The outer end portions of the blades 24, 24 carry auxiliary aerofoil flaps 26, 26 which are so positioned and which can be so adjusted or moved as to enable the operator to control the operation of the aircraft. Each flap 26 is spaced transversely, preferably to a substantial extent, from the longitudinal mean axis of the blade. The term "transversely" is used to indicate spacing in the plane of rotation, and unless otherwise stated it may include either forward spacing or rearward spacing. The flap is shown as spaced forwardly from the said mean axis so as to be adjacent the leading edge of the blade. As shown, the flap 26 is not only spaced transversely from the blade but is also spaced axially with respect thereto. The term "axially" is used in connection with the positioning of the flaps to indicate spacing in the direction of the axis of rotation, and unless otherwise stated it may include either spacing in the direction of the aerodynamic action of the rotor or in the opposite direction. The direction of aerodynamic action is the axial direction in which the rotor tends to move. In the case of a rotor for a rotary wing aircraft the term "axially" may include either upward spacing or downward spacing. The flap may be spaced either upwardly or downwardly, and one advantageous form of construction and mounting for the flap 26 is shown in detail in Figs. 4 to 10 wherein the flap is spaced upwardly. Reference will be had to these figures for a detailed description.

The main body of the blade 24 is shown as being formed of wood which may be laminated in accordance with usual practice, but the invention is not limited to a blade formed of wood nor to a blade of solid construction. When the blade is formed of wood the cross-sectional area at the root portion is preferably greater than the cross-sectional area at any other portion. Projecting forwardly from the blade 24 is an arm 28 which may comprise a single strip of metal bent into U-shaped form with the ends thereof seated in depressions formed in the blade and held by bolts 30, 30. The sides of the space between the top and bottom walls of the metal strip are closed by vertical walls 32. When the flap 26 is spaced upwardly, the arm 28 carries an upwardly extending support in the form of two upwardly extending brackets 34, 34 which are spaced apart transversely of the arm and longitudinally of the blade, these brackets being secured to the arm 28 by welding or otherwise. To provide lateral rigidity one of the brackets 34 is supported by a diagonal strut 35.

The aerofoil flap 26 is preferably formed of laminated wood but the invention is not limited to a flap formed of wood nor to a flap of solid construction. The flap is provided with a central recess into which the upper ends of the brackets 34, 34 extend. Positioned within the said recess and extending through apertures in the upper ends of the brackets 34, 34 is a substantially horizontal pivot rod 36 on which are mounted two anti-friction bearings 38, 38. The outer races or housings of these bearings are suitably connected with strips 42 and 44 seated in depressions in the body of the flap and held in place by bolts 46, 46. It will be seen that this construction permits the flap to move angularly about a substantially horizontal axis extending longitudinally of the blade, that is, about an axis substantially parallel with the mean axis of the blade.

Figure 5:
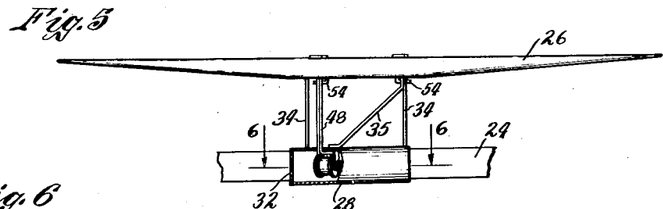
Fig. 5 is a front view of the parts shown in Fig. 4.
Figure 6:
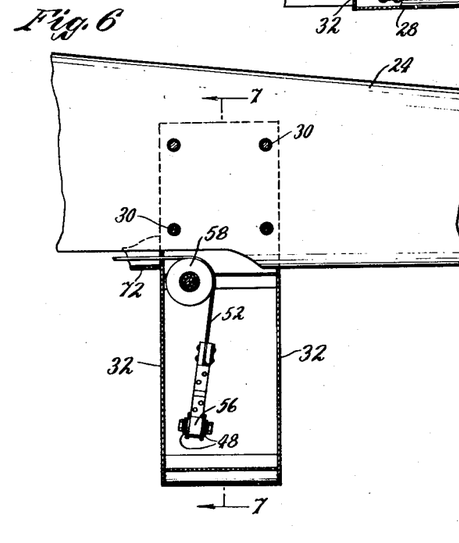
Fig. 6 is a fragmentary sectional view taken along the line 6—6 of Fig. 5.
Figure 7:
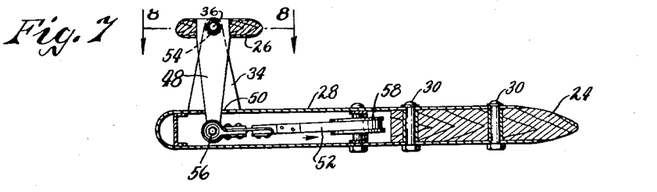
Fig. 7 is a vertical sectional view taken along the line 7—7 of Fig. 6.
Figure 8:
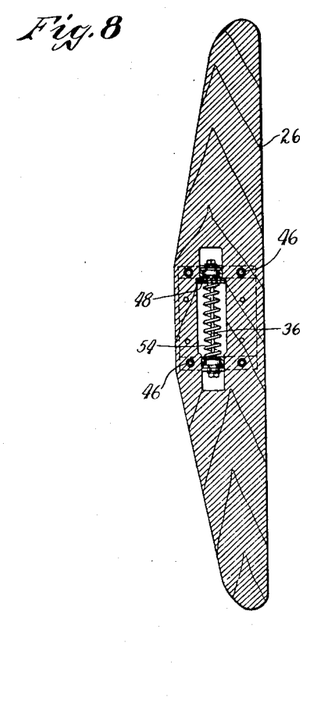
Fig. 8 is a horizontal sectional view taken along the line 8—8 of Fig. 7.
Figure 9:
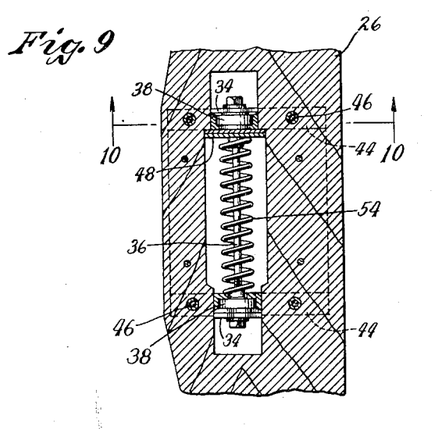
Fig. 9 is a view similar to Fig. 8 but showing some of the parts on an enlarged scale.
Figure 10:
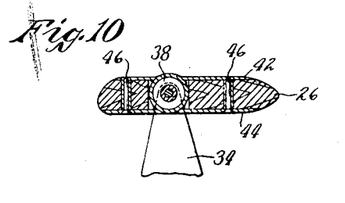
Fig. 10 is a transverse sectional view taken along the line 10—10 of Fig. 9.

For moving the flap angularly, there is provided a downwardly extending horn 48 rigidly secured to the outer housing of one of the bearings 38, the lower end of the horn extending through a slot 50 into the space within the hollow arm 28. As shown, the horn 48 comprises two metallic plates, the lower ends of which are separated as shown in Figs. 5 and 6. Suitable mechanism is associated with the horn 48 for controlling the angular adjustment or movement of the flap 26. This mechanism may be widely varied but one example includes a tension element 52 connected with the horn. The tension element 52 can move the horn 48 in one direction only, and when such a tension element is used a spring is provided for biasing the flap and the horn for movement in the opposite direction. As shown, the flap 26 is biased for movement in the clockwise direction, as viewed in Fig. 7, by means of a coil spring 54 surrounding the pivot rod 36. One end of the spring engages one of the brackets 34 as shown in Fig. 5, and the other end of the spring engages the horn 48. The spring is substantially loaded so as to tend to firmly hold the flap in its extreme clockwise position.

The forward end of the tension element 52 is connected with the horn 48 by means of an apertured member 56 which receives a pin extending transversely between the two plates of the horn 48, as shown in Fig. 6. The tension element is shown as being a flat metallic strip, and this strip passes around a sheave 58 rotatable on a vertical pin extending between the top and bottom walls of the arm 28. The lower end portion of the horn 48 is slightly twisted to conform to the angle of the strip 52. From the sheave 58 the strip 52 extends longitudinally of the blade adjacent the leading edge thereof to the hub 22. It will be seen that when the tension in the element 52 is at its maximum, the flap 26 is held in its extreme counterclockwise position, overcoming the tendency of the spring 54 to move the flap in the clockwise direction. When the tension in the element 52 is decreased, the flap is moved in the clockwise direction by the spring. The flap can thus be adjusted by means of the tension element to any desired angular position within predetermined limits.

While tension members 52 and 124, 126, with associated biasing springs, have been shown and described for adjusting the flaps, the invention is not so limited and other suitable flap adjusting means may be substituted. For instance the tension members may be replaced by rods adapted to both push and pull, together with bell cranks for operating the rods. With this construction the spring 54 could be omitted.

Figure 11:
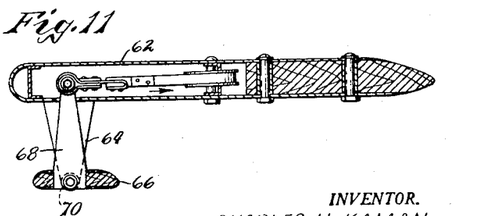
Fig. 11 is a view similar to Fig. 7 but showing an alternative mounting for the adjustable flap.

Fig. 11 shows an alternative construction and mounting for the flap, this being similar to the showing in Figs. 4 to 10 except that the flap is spaced downwardly from the blade rather than upwardly. Projecting forwardly from the blade 24 is an arm 62 which is similar to the arm 28. The arm 62 carries two downwardly extending brackets 64 which are similar to the brackets 34, 34. A flap 66 is provided which is similar to the flap 26 and which is connected with the brackets 64 in the same manner that the flap 26 is connected with the brackets 34, 34. For moving the flap 66 angularly there is provided an upwardly extending horn 68 similar to the horn 48, the upper end of the horn extending through a slot in the lower wall of the arm 62 and being connected with the tension element 52 in the manner already described. A spring 70 is provided which is similar to the spring 54 but which is connected to bias the flap 66 for movement in the counterclockwise direction. It will be seen that when the tension in the element 52 is at its minimum, the flap 66 is held by the spring in its extreme counterclockwise position. When the tension in the element 52 is increased the flap will be moved in opposition to the spring to any desired angular position within predetermined limits.

Figures 12, 13, 15, 16:
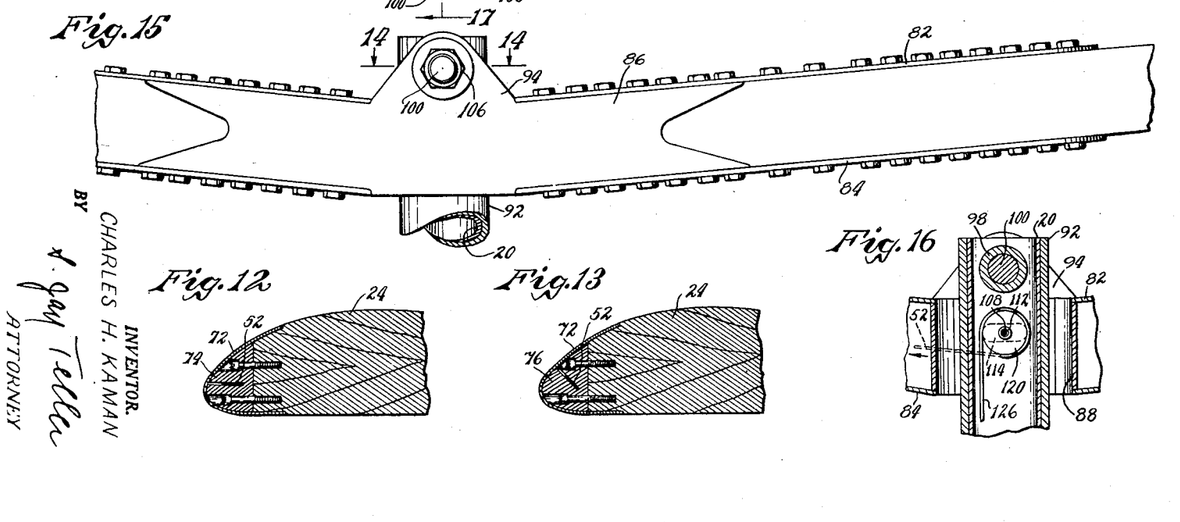
Figs. 12 and 13 are fragmentary transverse sectional views taken at different planes along the leading edge portion of one of the blades.
Fig. 15 is a side view of the parts shown in Fig. 14.
Fig. 16 is a fragmentary vertical sectional view taken along the line 16—16 of Fig. 14.
Figure 14:
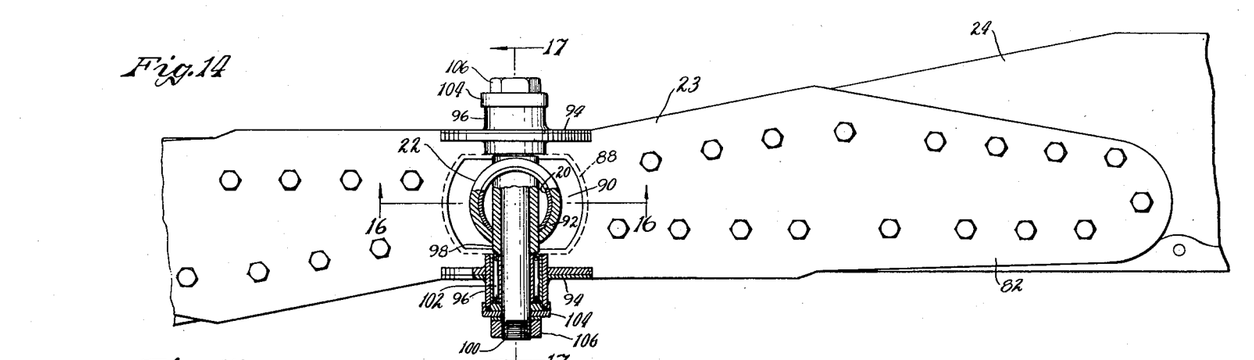
Fig. 14 is an enlarged plan view of one of the main hubs, together with portions of the wings carried thereby, a portion of this view being in section along the line 14—14 of Fig. 15.
Figure 17:
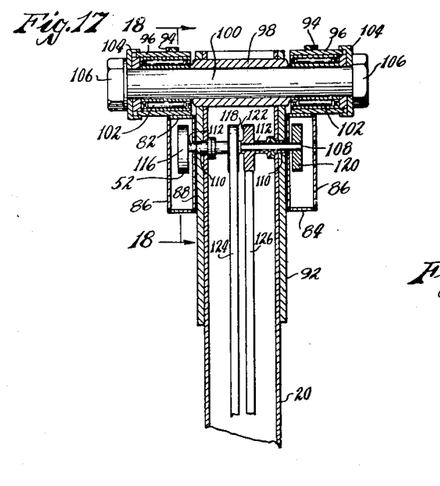
Fig. 17 is a vertical sectional view taken along the line 17—17 of Fig. 14.

Whether the flap is spaced upwardly as shown in Figs. 4 to 10, or downwardly as shown in Fig. 11, the main body of the blade extending inwardly from the arm 28, or from the arm 62, is cut away at the leading edge to provide a space or opening for the tension element or strip 52. This space is enclosed by a leading edge member 72 which conforms to the required shape of the blade. As will be presently explained, the strip extends at the hub over a pulley having a substantially horizontal axis, and it is therefore necessary for the strip to be twisted through a net angle of 90° between the sheave 58 and the hub pulley. Actually, in order to minimize vibration, the strip may be twisted through a larger angle, as for instance 270°. The strip 52 is preferably supported within the space or opening enclosed by the member 72 by means of slotted guide blocks as shown in Figs. 12 and 13. Fig. 12 shows a block 74 for supporting a portion of the strip which is horizontal, and Fig. 13 shows a block 76 for supporting a portion of the strip which is at an angle of 45°.

It has already been stated that the support 23 of each rotor serves to hold the blades 24, 24 thereof so that they are relatively fixed with respect to the hub 22, being bodily rotatable in unison with the hub, but nevertheless held to prevent any relative rotative movements of the root ends thereof about axes extending longitudinally of the blades. While the blades are connected with the hub to the extent above stated, they are nevertheless capable of limited pivotal movements, in unison about a substantially horizontal axis which is perpendicular to the axis of rotation. The details of the hub and of the connection thereof with the rotor are shown in Figs. 14 to 18, and reference will be had to these figures in the following description.

Each of the blade supports 23 preferably comprises substantially parallel top and bottom plates 82 and 84 which at their outer portions conform in transverse contour to the transverse contour of the blades. The inner portions of the plates 82 and 84 are connected, as for instance by welding, with vertical plates 86, 86, the said four plates at the central portions thereof providing a space which is rectangular in transverse section. Each support 23 is provided at the center with a flat-sided hollow member 88 which extends vertically between the top and bottom plates 82 and 84, the said plates being provided with openings conforming in shape to the shape of the said hollow member. Thus the said hollow member, together with the said openings in the top and bottom plates, provides a vertical well 90 extending entirely through the support 23. The corresponding supporting and driving shaft 20 extends entirely through the well 90 and projects somewhat above the top plate 82. The said shaft 20 is hollow and the upper portion thereof is provided with an outer sleeve or tube 92.

The side plates 86, 86 are provided with upward extending ears 94, 94, these being apertured to receive horizontal bearing housings 96, 96 which are welded in place. The shaft 20 and the sleeve 92 are transversely apertured near their upper ends to receive a horizontal bushing 98 which is welded or otherwise secured in place. A horizontal pivot pin 100 extends through the bushing 98 and also through the bearing bushings 96, 96. Interposed between the pin 100 and the bearing bushings 96, 96 are antifriction bearings 102, 102.

At the outer ends of the bearings 102, 102 are end caps 104, 104 held in place by nuts 106, 106 engaging the pin 100. It will be seen that by means of the construction described, the support 23 and also the rotor blades 24, 24 are connected with the shaft 20 for rotation therewith, but are nevertheless pivotally movable in unison with respect thereto about the axis of the bearing pin 100, which axis is substantially horizontal.

Figure 18:
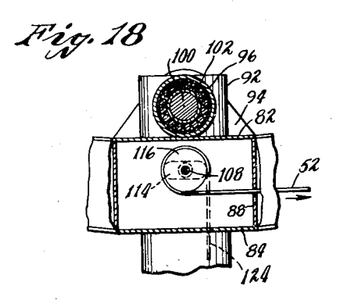
Fig. 18 is a vertical sectional view taken along the line 18—18 of Fig. 17.

Extending transversely across the shaft 20 and its sleeve 92 is a small shaft 108 which is below and parallel with the pivot pin 100. Rotatably mounted on the shaft 108 and also rotatable in bearing bushings 110 in apertures in the shaft 20 and the sleeve 92 are two similar bushings 112, 112. The shaft 108 and the bushings 112, 112 project outwardly beyond the shaft 20 and the sleeve 92 and through the flat side walls of the member 88 forming the well 90. The said side walls are slotted at 114, as shown in Figs. 16 and 18, to permit the support 23 and the member 88, together with the blades 24, 24, to move pivotally about the axis of the pivot pin 100. The left hand bushing 112, as viewed in Fig. 17, carries at its outer end a pulley 116 which is rigidly secured to it, and also carries at its inner end a pulley 118 which is rigidly secured to it. Similarly, the right hand bushing 112 carries at its outer end a pulley 120 which is rigidly secured to it and also carries at its inner end a pulley 122 which is rigidly secured to it. It will be observed that the pulleys 116 and 120 are located in the spaces between the side plates 86, 86 of the support 23 and the side walls of the member 88.

As viewed in Fig. 18, the tension strip 52 for the right hand blade and flap is secured to and wrapped partly around the pulley 116 from the bottom thereof. A tension strip 124 is secured to and wrapped partly around the pulley 118 from the right side thereof. By reference to Figs. 17 and 18 it will be seen that when the strip 124 is permitted to move upward, the said strip can wind on the pulley 118, thus permitting the said pulley to move in the counterclockwise direction. This permits the corresponding strip 52 to unwind from the pulley 116 and to move in the direction indicated by the arrow. This movement of the strip 52 permits the corresponding flap 26 to move in the clockwise direction, as viewed in Fig. 7, under the influence of the spring 54, the pitch of the flap being thus increased.

As viewed in Fig. 16, the tension strip 52 for the left hand blade and flap is secured to and wrapped partly around the pulley 120 from the bottom thereof. A tension strip 126 is secured to and wrapped partly around the pulley 122 from the left side thereof. By reference to Figs. 16 and 17, it will be seen that when the strip 126 is permitted to move upward the said strip can wind on the pulley 122 thus permitting the said pulley to move in the clockwise direction. This permits the corresponding strip 52 to unwind from the pulley 120 (shown in Fig. 16) and to move in the direction indicated by the arrow. This movement of the strip 52 permits the corresponding flap 26 to move in the clockwise direction, as viewed from the tip of its blade, under the influence of its spring 54, the pitch of the flap being thus increased.

From the foregoing description, it will be seen that the flaps 26, 26 of the two blades may be moved in the clockwise or pitch increasing directions by permitting the strips 124 and 126 to move upward so that the flap biasing spring 54 can act. When the strips 124 and 126 are moved downward the blades are moved in the counterclockwise or pitch decreasing directions in opposition to the springs 54.

Figure 19:
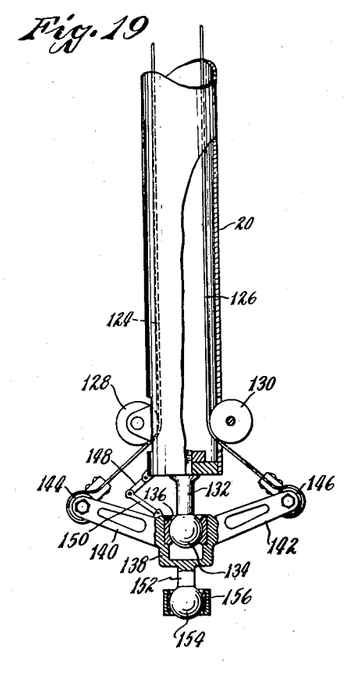
Fig. 19 is a fragmentary view, partly in section, showing the lower portion of the drive shaft and immediately associated parts.

Fig. 19 shows the lower end portion of the shaft 20 and the parts carried thereby. The strips 124 and 126 extend downward through the shaft and are guided outward through slots therein around pulleys 128 and 130 carried by the shaft. Projecting downward from the lower end of the shaft 20 is a stud 132 having a ball 134 at the lower end thereof. The ball 134 engages a ball socket 136 in a spider or azimuth plate 138 having rigidly connected oppositely extending arms 140 and 142. The lower ends of the strips 124 and 126 are connected with the ends of the arms 140 and 142 by means of ball sockets 144 and 146. In order to insure rotation of the spider 138 in unison with the shaft 20, the said parts are connected by means of pivoted links 148 and 150. Projecting downward from the spider is a stud 152 having a ball 154 at the lower end thereof. The ball 154 engages a ball socket 156 which is movable by a suitable mechanism such as that shown schematically in Fig. 20. The flexible strips 52, 52 and 124, 126, together with the parts directly coacting therewith including the ball 154, constitute one example of relatively movable flap moving connections extending from the flaps to the fuselage, the said connections being relatively movable with respect to the fuselage. When there are two rotors there are two sets of such relatively movable flap moving connections.

It has been stated that the blades 24 may be formed of wood in accordance with usual practice. Each blade, whether formed of wood or otherwise, is capable of substantial twisting about its longitudinal mean axis and with respect to its nonrotatable root portion so as to change its effective pitch. The blade has torsional resiliency which causes it to be restored to its initial normal shape after twisting. In accordance with the invention the areodynamic action of the flaps 26 is utilized to torsionally twist the blades during rotation so as to change the effective pitches thereof to definitely determined extents. Twisting takes place progressively from the root portion to the flap. Each flap is spaced transversely from the longitudinal mean axis of the blade so that the areodynamic action of the flap tends to twist the blade to change the effective pitch, and the flap is shown as adjacent or spaced forwardly from the leading edge of the blade. When the flap is spaced forwardly and when it is angularly moved to increase its own pitch, the increased lifting action of the flap during rotative movement applies a moment to the blade which serves to twist it and to substantially increase the effective pitch thereof. Thus when the pitch of the flap is increased there is an increased total lifting force due in part to the increased lift of the flap itself, but due in much larger part to the increased lift of the blade resulting from the twisting thereof. When the flap is angularly moved to decrease the pitch thereof, the action is the reverse of that described and the effective pitch of the blade is decreased.

The positioning of the flap at or forwardly from the leading edge, while not essential as concerns the broadest aspects of the invention, is sometimes advantageous, as it enables the lifting force of the flap to augment the lifting force of the blade, while at the same time serving to twist the plane to increase its pitch and its lifting force.

The effective working area of the blade is principally the outer third thereof and the flap is therefore preferably positioned along the blade so as to cause a maximum of change in the effective pitch thereof. Obviously, the twisting takes place progressively between the root portion of the blade and the flap and the portion of the blade beyond the flap is rotated without twisting. It has been found that the flap should be placed at a position within the range of about 60% to about 90% of the distance from the axis of rotation to the tip of the blade. A location at approximately 75% of the distance from the axis to the tip is ordinarily preferable. With the flap positioned as described, it is spaced sufficiently outwardly from the axis of rotation to give a substantial amount of progressive twist to the blade between the root portion thereof and the flap, and it is spaced sufficiently inwardly from the tip to rotate and change the pitch of the major portion of the effective working area of the blade. The practical result is that by utilizing the flaps to twist the blades in the manner described, the changes in the effective pitches are substantially equivalent to the bodily rotation of the entire blade which has been the prior conventional practice.

By way of example it may be assumed that the blade has a normal positive pitch of 10° and it may be further assumed that the blade and the flap are in torsional equilibrium during rotation when the flap is at zero pitch. If the pitch of the flap is increased it tends during rotative movement to twist the blade, this tendency being resisted by the resiliency of the blade, and an equilibrium must be established between these two forces. The parts may be designed for various ratios of equilibrium. It may be assumed, by way of example, that the parts are so designed that equilibrium will be established when the aerodynamic lifting action of the flap is one-half that of the resistance offered by the blade to twisting. If the pitch of the flap is initially increased by 1° the blade will be twisted to a certain extent to increase the pitch thereof. However, this increase in the pitch of the blade correspondingly increases the pitch of the flap by reason of the forward position of the latter, and equilibrium will be attained when the pitch of the flap has been increased by 2° and the pitch of the blade has been increased by 1°. In actual design other factors must be considered, such as the forces due to the aerodynamic pitching moment properties of the blades, the centrifugal twisting moments due to the mass of the flaps and their supports which tend to effect twisting of the blades, the weight of the flaps and their supports which also tend to effect twisting of the blades, and the centrifugal twisting forces on the blade alone.

It may be a matter of design or choice whether the flap is spaced above the blade as shown in Figs. 4 to 10, or is spaced below the blade as shown in Fig. 11. However, it is important that the flap be vertically spaced from the blade in one direction or the other in order that turbulence effects from the flap may not disturb the aerodynamic action of the blade.

While the flap may be spaced axially from the blade either upwardly or downwardly as already stated, there is a definite advantage in upward spacing as shown in Figs. 4 to 10, particularly when combined with forward spacing. The aerodynamic drag of the flap as it is moved with the rotor provides a moment tending to twist the blade in the direction to increase the pitch thereof, this drag moment supplementing the twisting moment due to the aerodynamic lift of the flap and the forward spacing thereof.

In practice the parts may be so designed that each flap has a negative pitch when in its extreme position, the tendency thus being for the flap to initially decrease rather than increase the pitch of the blade. As the flap is adjusted it moves toward its position of zero pitch, thus permitting the blade to assume its normal position without twist. The flap is then moved to various positions of increased pitch, in which positions it increases the effective pitch of the blade as already described.

Referring to the flap moving connections, as shown in Figs. 16 to 19, it will be seen that when the ball 154 is moved vertically upward the strips 124 and 126 are permitted to move upward in unison, thus simultaneously increasing the pitches of the two flaps 26, 26 with resultant increases in the pitches of the corresponding blades. The collective or basic pitch of the rotor is thus increased. When the ball 154 is moved vertically downward, the strips 124 and 126 are moved downward, thus simultaneously decreasing the pitches of the two flaps 26, 26, with resultant decreases in the pitches of the corresponding blades. The collective or basic pitch of the rotor is thus decreased.

If the ball 154 is moved horizontally, as for instance toward the right as viewed in Fig. 19, the spider 138 will be rocked in the counterclockwise direction about the axis of the ball 134, the strip 126 being permitted to move upward and the strip 124 being caused to move downward. This serves to increase the pitches of the right hand flap and blade, as viewed in Fig. 18, and to decrease the pitches of the left hand flap and blade, as viewed in Fig. 16. Inasmuch as the shaft 20 and the parts carried thereby are rotating, it will be seen that when the ball 154 is held in a fixed position at one side of the axis of rotation, both flaps will be oscillated through a predetermined angle once during each rotation. The extent of oscillation is dependent on the amount of horizontal movement of the ball 154. For instance, if it be assumed that the arms 140 and 142 are in vertical register with the blades and if it be further assumed that movement of the ball 154 toward the right, as viewed in Fig. 19, is toward the rear of the aircraft, it will be seen that each flap and the corresponding blade will be at maximum pitch when they are at the rear, and that each flap and the corresponding blade will be at minimum pitch when they are at the front. Thus the cycle pitch of the rotor can be controlled. By moving the ball 154 toward the front, or toward one side or the other, the positions of maximum and minimum pitches can be changed to any extent desired for the required control of the aircraft.

In the immediately foregoing description it has been assumed that the flaps are spaced upwardly from the blades, as shown in Figs. 4 to 10. If the flaps are spaced downwardly from the blades, as shown in Fig. 11, the strips 124 and 126 must be moved in the directions opposite to those stated in order to obtain the results described.

Figure 20:
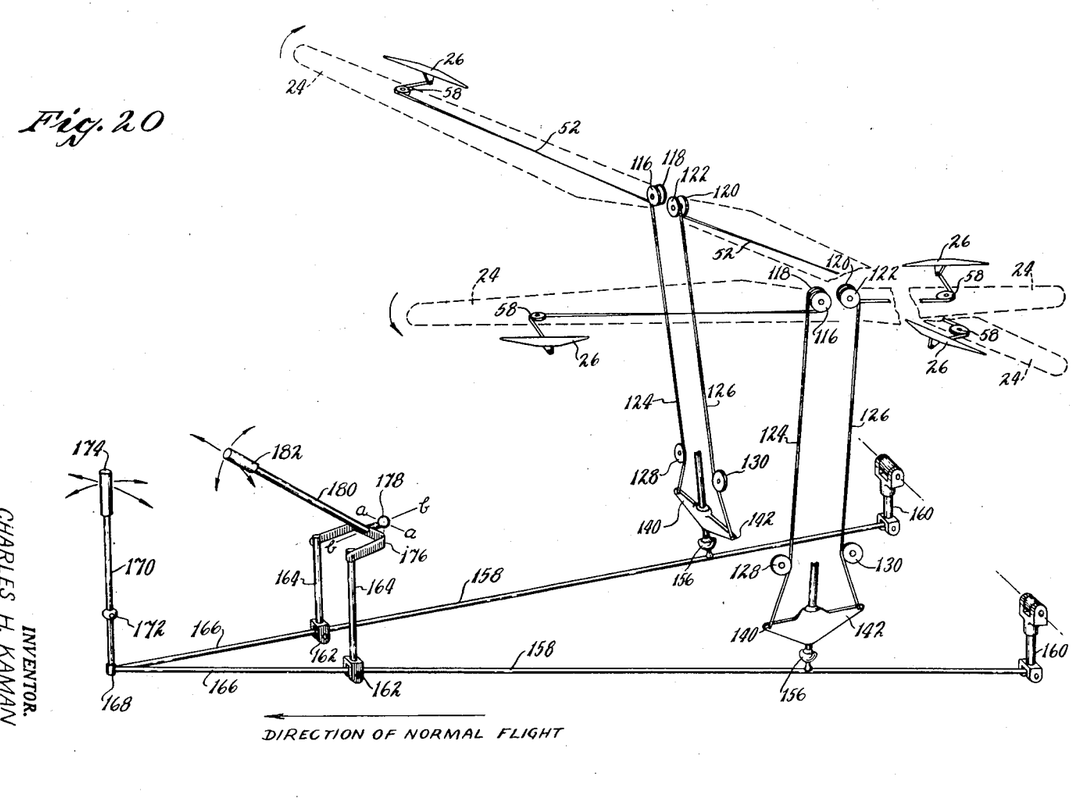
Fig. 20 is a schematic view showing the manually operable control mechanism.

Fig. 20 shows schematically a pilot controlled flap actuating mechanism which is on the fuselage and which is connected with the before-described flap moving connections. The said mechanism serves to move the socket member 156 and when there are two rotors it serves to move the socket members 156 for both rotors for controlling the flight of the aircraft. The sockets 156, 156 are carried by substantially horizontal rods 158, 158 which are supported at their rear ends by pivoted links 160. The links are so connected with the rods that the latter may move either longitudinally or angularly about the axes of the links. The forward ends of the rods 158, 158 are pivotally connected at 162, 162 with vertical links 164, 164. Also connected with the links 164, 164 at 162, 162 are substantially horizontal rods 166, 166. The pivotal connections at 162, 162 are such that the rods can move relatively to each other about the horizontal axes of the pivots, but are prevented from relative transverse movements. The rods 166, 166 are connected at their front ends by means of a ball and socket joint at 168 with a normally vertical stick 170. The stick 170 is supported by means of a ball and socket joint at 172 and is provided at its upper end with a handle 174. The links 164, 164 are pivotally connected with the forward ends of the legs of a bifurcated yoke 176 which is supported at 178. The support at 178 is not a ball and socket joint but is so constructed that the yoke 176 may move either about a transverse horizontal axis $a$—$a$ or about a longitudinal horizontal axis $b$—$b$, but not otherwise. Rigidly connected with the yoke 176 and extending forwardly and upwardly therefrom at an angle of approximately 45° is a stick 180 having a handle 182.

If it be assumed that the stick 170 is stationary, it will be seen that upward or downward movement of the stick 180 about the axis $a$—$a$ serves to swing the rods 158, 158 upward or downward with resultant upward or downward movement of the sockets 156, 156 and of the balls engaged therewith. As has already been explained, upward movement of the sockets and balls serves to increase the collective or basic flap induced pitches of the blades thus giving the rotors increased lifting power. Downward movement of the sockets and balls serves to decrease the collective or basic flap induced pitches of the blades thus giving the rotors decreased lifting power. Thus the pilot, by moving the stick 180 upward or downward, can increase or decrease the lifting power of the rotors, and can cause the aircraft to move vertically upward or downward as required.

When the stick 170 is moved forward, the rods 166, 166 and 158, 158 are moved rearward thus moving the sockets 156, 156 rearward. As already explained, rearward movement of the sockets 156, 156 serves to effect cyclic oscillation of the flaps during each revolution with the flaps having their maximum pitch when they are in their rearward positions and having their minimum pitch when in their forward positions. This tends to incline the aircraft downward toward the front and causes travel or flight in the forward direction. The stick 170 can be moved in any direction thus correspondingly changing the timing of the cyclic oscillations and shifting the positions of maximum and minimum flap induced pitches of the blades and causing travel or flight of the aircraft in any desired direction.

As thus far described, it has been assumed that the arms 140 and 142 of the spider or azimuth plate 138 are in vertical register with the respective blades of the rotor. Actually, however, as indicated in Fig. 20, the arms 140 and 142 are out of vertical register with the blades and lead them by substantial angles. The changes in the effective pitches of the blades, being dependent on the aerodynamic action of the flaps, cannot be effected instantly and there is a slight lag between the actual movement of the flaps and the change in effective pitches. However, there is a substantial lag between the azimuth position at which the rotor blades assume their increased pitch and the azimuth position at which the rotor blades assume their positions of maximum pitches. The amount of lag is principally a function of the resonant properties of the flatwise beam (comprising the connected blades 24, 24) and hinge criteria as well as the torsional criteria. It is also a function of rotative speed. In a perfectly general case the lag angle may be anything between 0° and 90°, but in special circumstances could be above 90°. It is therefore necessary to adjust the lead of the arms 140 and 142 to accomplish the best compromise lead angle for all flight conditions and rotative speeds.

With a control mechanism, such as shown in Fig. 20, the lag in the effective pitches of the blades could be compensated by correspondingly moving the stick 170. In such case, however, the stick would not be inclined in the direction of desired flight but at an angle thereto. By providing a lead angle for the arms 140 and 142, this difficulty is overcome and the direction of flight will conform to the position of the stick 170.

The stick 180 is movable not only upward or downward about the axis $a$—$a$, as already described, but is also movable transversely about the axis $b$—$b$. By moving the stick 180 transversely, the lifting power of one rotor can be increased and that of the other rotor decreased, thus effecting an unbalanced turning torque on the aircraft together with a slight banking. The result is a change in the direction of flight.

By moving the two sticks 180 and 170 simultaneously, or alternatively, the pilot can control the operation of the aircraft in any desired manner to cause it to move upward or downward and to effect flight in any desired direction and to change the direction of flight as required. The handle on one of the sticks, as for instance the handle 182 on the stick 180, may be rotatable and may be connected with the throttle control of the power plant. Thus the pilot can adjust the throttle without removing his hands from the sticks, and the amount of power can be increased or decreased to meet requirements.

The control mechanism as shown in Fig. 20 is not herein claimed specifically as a part of the present invention, this being shown, described and claimed in my copending application for Aircraft of rotary wing type, Serial No. 731,656, filed February 28, 1947, the last said application being a continuation-in-part of this present application.

As each rotor is rotated and as the aircraft moves in a given direction, as for instance in the forward direction, the two connected blades of each rotor tend to oscillate or flap with respect to the hub about the substantially horizontal axis of the pivot pin 100. This is due to the fact that the net air speed encountered by the blade moving in the forward direction is greater than the net air speed of the blade moving in the rearward or retreating direction. On account of the greater net air speed, the forward moving blade has a greater lift than the rearward moving or retreating blade, the result being that the forward moving blade swings upward and the rearward moving or retreating blade swings downward. Although this flapping feature has been generally accepted in rotary wings as a convenient means for automatically achieving cyclic pitch as forward motion of the aircraft increases, tilting of the tip path plane relative to the drive shaft tends to introduce tremendous oscillating forces and moments in the plane of rotation as a function of such flapping. These are scientifically computed as Coriolis loads and are exactly equivalent to the well known accelerated motions in a conventional universal joint when the shafts are operating at an angularity.

In accordance with one phase of the invention this highly adverse load condition in the plane of rotation is mitigated by provision of means for practically eliminating or substantially limiting the flapping oscillation motion beyond maximum prescribed limits, this being effected by relatively moving flaps carried by the blades. When a blade swings upwardly its flap is automatically moved so that the net total effective pitch of the blade with its flap is reduced. When a blade swings downwardly its flap is automatically moved so that the net total effective pitch of the blade with its flap is increased. The flaps provided on the blades for this purpose may be the flaps 26, 26 already described, but as to this the invention is not necessarily limited. When flaps such as 26, 26 are provided the control mechanism for such flaps, as already described, serves to automatically move the flaps in such a manner as to attain the results described.

By reference to Fig. 18, it will be seen that as the rotor oscillates so that the right hand blade moves upward the central portion of the support moves toward the right, the pulley 116 and the attached portion of the strip 52 remaining relatively stationary. This is equivalent to a movement of the strip 52 toward the left with respect to its blade, and the result being that the twisting moment of the corresponding flap is decreased. The decreased twisting moment of the flap causes a decrease in the twisting of the blade with the result that the total net pitch of the blade and the flap is reduced, thus reducing the tendency of the blade to move upward. By reference to Fig. 16 it will be seen that as the rotor oscillates so that the left hand blade moves downward, the central portion of the support moves toward the right, the pulley 120 (not shown in this figure) and the attached portion of the strip 52 remaining relatively stationary. This is equivalent to a movement of the strip 52 toward the left with respect to its blade, the result being that the pitch of the corresponding flap is increased. The increased pitch of the flap causes an increase in the twisting of the blade with the result that the total net pitch of the blade and the flap is increased, thus reducing the tendency of the blade to move downward. On account of decreasing the effective pitch of one blade and increasing the effective pitch of the other blade, the net result is that the tendency of the blades to oscillate is eliminated, or at least very substantially reduced.

It will be seen that the automatic control of the flaps to eliminate or minimize oscillation or flapping is supplemental to and entirely independent of the manual control that has been described. The described automatic increases and decreases in the pitches of the flaps are added to or subtracted from the pitches which have been established by the described manual flap actuating mechanism. The automatic control is equally effective for all directions of flight.

It will be particularly observed that the horizontal pivotal axis of the rotor at 100 is above the support 23. On account of the positive dihedral or coning angles of the blades their centers of gravity are approximately in a plane passing through the axis at 100 and perpendicular to the axis of rotation. This tends to further minimize the Coriolis excitations in the plane of rotation during the presence of small flapping by eliminating or minimizing any shifting of the rotor center of gravity from the point defined by the intersection of the center lines of members 100 and 20.

Some of the points of utility and advantage incident to the invention have been pointed out and described in connection with the foregoing general description thereof. However, there are other points which have not been mentioned or which at least have not been particularly emphasized.

One of the important advantages of the invention, particularly when used in a rotary wing aircraft such as a helicopter, is that the control mechanism for the flaps is required to handle only relatively small forces and can therefore be light and simple and easily handled. In rotary wing aircraft of conventional types it has been necessary to incorporate many complicated features in order to secure proper control. This is due to the fact that the blades have been pivoted for turning about generally longitudinal axes substantially parallel with the radial center lines at the blade roots. For mounting the blades fairly large, heavy and costly ball or roller bearings have been necessary. However, complex blade deflections and deformations during flight invariably give rise to moments, both aerodynamic and dynamic about such axes. The forces resulting from such moments do not cancel out among the several blades and are to a considerable extent transmitted back to the control stick with the resultant effect known as "stick shake." With a rotor embodying the invention, the forces necessary for control are very small inasmuch as only the relatively small flaps are moved, the major portion of the forces required to change the effective pitches of the blades being aerodynamic forces resulting from the flaps themselves. The necessary amount of flap adjustment is very small and the ratio of movement between the stick and the flaps may be in the order of 100 to 1. In view of the very small movements required to adjust the flaps, and in view of the very favorable ratio of movements, only a negligible effort is necessary to move the stick and there is little or no tendency for forces generated at the flaps to be transmitted back to the stick to cause "shake."

In view of the small size of the flaps, the bearings and other parts for supporting them can be small, the total weight being very much less than that of the conventional large bearings which are utilized when the entire blades are bodily rotatable. Furthermore, the large blade supporting bearings as heretofore used tend to rapidly deteriorate for the reason that they are subject to heavy loads and to rotary vibration due to rapidly changing forces transmitting from the blades. Rotary vibration at the bearings causes lubrication failure with resultant rusting and other deterioration. This difficulty is largely, if not in fact completely, overcome with the smaller lighter bearings used for supporting the relatively small flaps.

In order to avoid large oscillating control moments during forward motion due to the pitching properties of high lift aerofoils, it has been necessary in conventional machines to sacrifice aerodynamic performances by utilizing a symmetrical aerofoil section with zero pitching moment coefficients. Since the flap is a highly powerful pitch actuator, blade chordwise pitching moments are not objectionable. On the contrary, utilization of high lift, highly cambered aerofoils greatly increases the range of operating speeds of rotation before aerodynamic stall. Since the minimum power required by a rotor occurs just below stall, it is possible to operate a helicopter at a lower speed of rotation, with resultant increase economy due to the reduced rotor power required by an increase in payload.

The flutter speed, a self-excited torsional vibration, is critically a function of the relative location of the chordal aerofoil center of gravity and the blade chordal aerofoil center of air pressure or the aerodynamic center. It has heretofore been necessary for the most part to mass balance rotary blades in order to locate the center of gravity at or in front of the center of air pressure. This reflects itself in excessive weight and undue structural complication. With the flap mounted in front of the rotor blade its mass is inherently disposed in such a fashion as to move the overall chordwise center of gravity in front of the aerodynamic center which is usually about 25% back along the chord measured from the leading edge. The flutter frequency is thereby raised to infinity.

In order to alleviate pilot fatigue, difficulty and coordination it has been the prior practice in the construction of helicopters to incorporate elaborate devices for insuring the rotation of the rotors at substantially constant speeds. These elaborate and expensive control devices are unnecessary with a rotor embodying the present invention, inasmuch as the rotor is self-regulating as to speed. If there is a tendency for any reason for the rotative speeds of the rotors to slightly increase, this increase in speed will increase the lifting forces exerted on the flaps, which lifting forces will in turn increase the effective pitches of the blades. The increased pitches of the blades increases the resistance to rotation and reduces the speed to normal notwithstanding the tendency toward increased speed. Conversely, if there is a tendency for any reason for the rotative speeds of the rotors to slightly decrease, this decrease in speed will decrease the lifting forces exerted on the flaps which decreased lifting forces will in turn cause a decrease in the effective pitches of the blades. The decreased pitches of the blades decreases the resistance to rotation and causes the speed to be increased to normal, notwithstanding the tendency toward decreased speed. It will be understood that the changes in pitch resulting from increased or decreased speed, occur without any movement of the flaps about their pivotal axes.

In further explanation of the automatic speed regulation, it will be understood that for a predetermined rotative speed each flap, at any selected position of adjustment thereof, serves to twist its blade to a definite extent so as to maintain it at a predetermined effective pitch. Each flap, upon an increase in speed above the said predetermined speed, acts automatically to cause an increase in the pitch of the blade above the said predetermined pitch, and the resistance to rotation is increased thereby reducing the speed. Each flap, upon a decrease in speed below the said predetermined speed, acts automatically to permit a decrease in the pitch of its blade below the said predetermined pitch, and the resistance to rotation is decreased thereby increasing the speed.

During hovering helicopters frequently have a highly undesirable tendency toward instability. This tendency is manifested by a pendular motion about the longitudinal axis of least inertia, and if undisturbed, increases disastrously in magnitude after a few cycles. In conventional helicopters this tendency toward pendular motion has been to some extent overcome by rather bulky auxiliary stabilizing mechanisms. With a helicopter embodying the present invention when there is a tendency for one rotor or the other to ascend as an incident to the pendular motion, the upward movement decreases the force acting on the flaps to twist the blades, with the result that the effective pitches of the blades are reduced, thus counteracting the tendency of the rotor to ascend. Conversely, when there is a tendency for one rotor or the other to descend as an incident to the pendular motion, the downward movement increases the net force acting on the flaps to twist the blades, with the result that the effective pitches of the blades are increased, thus counteracting the tendency of the rotor to descend. This action provides aerodynamic damping serving to eliminate or minimize the tendency toward pendular motion of the helicopter. Here again the changes in pitch occur without movement of the flaps about their pivotal axes.

What I claim is:

1. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being formed of wood with the cross-sectional area at its root portion greater than the cross-sectional area at any other portion and with a longitudinal opening therein extending along its leading edge from its root portion to a point at the outer portion thereof and each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades adjacent the outer ends of the said longitudinal openings in the leading edges thereof and angularly movable relatively to the blades about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative angular positions of the flaps, relatively movable flap moving connections extending from the flaps to the fuselage which connections include elements extending longitudinally of the blades and positioned within the said openings in the leading edges thereof, and a pilot controlled flap actuating mechanism on the fuselage for moving the said connections during rotation of the blades and flaps so as to angularly move the flaps relatively to the blades, the said flap actuating mechanism enabling the pilot to control the movement of the aircraft by reason of varying flap induced twisting of the blades and the resultant varying effective pitches thereof.

2. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades and angularly movable relatively thereto about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative angular positions of the flaps, relatively movable flap moving connections extending from the flaps to the fuselage, and a flap actuating mechanism on the fuselage for utilizing the said connections to successively and cyclically oscillate all of the flaps relatively to their respective blades during each rotation which mechanism is adjustable by the pilot to change the timing of the successive cyclic oscillations, the said actuating mechanism enabling the pilot to cause horizontal movement of the aircraft in any direction by reason of changes in the timing of the flap induced cyclic twisting of the blades.

3. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades and angularly movable relatively thereto about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative angular positions of the flaps, relatively movable flap moving connections extending from the flaps to the fuselage, and a pilot controlled flap actuating mechanism on the fuselage which mechanism includes means for moving the said connections to angularly move all of the flaps uniformly relatively to their respective blades and also includes means for moving the said connections to successively and cyclically oscillate all of the flaps relatively to their respective blades during each rotation which last said means is adjustable by the pilot to change the timing of the successive cyclic oscillations, the said actuating mechanism enabling the pilot to control vertical movement of the aircraft by reason of increased or decreased flap induced uniform twisting of the blades and enabling the pilot to cause horizontal movement of the aircraft in any direction by reason of changes in the timing of the flap induced cyclic twisting of the blades.

4. An aircraft of the rotary blade type including in combination, a fuselage, a power driven substantially vertical shaft connected with the fuselage, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades and angularly movable relatively thereto about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative angular positions of the flaps, a plurality of relatively movable flap moving connections extending to the fuselage from the respective flaps which connections respectively include vertically movable members rotatable with the shaft and equally spaced from the axis thereof, an adjustable azimuth member rotatable in synchronism with the shaft and connected with the said vertically movable members at positions spaced angularly forward from the respective blades, and pilot controlled means for angularly changing the axis of rotation of the azimuth member.

5. An aircraft of the rotary wing type including in combination, a fuselage, a power driven substantially vertical shaft connected with the fuselage, a rotor including a blade support connected with the shaft for rotation therewith and for relative pivotal movement about a substantially horizontal axis intersecting the shaft axis and also including two oppositely disposed similar radially extending aerofoil blades secured to the blade support for relative pivotal movement in unison therewith, the said blades having their root portions so held as to prevent rotative movements thereof about axes extending longitudinally of the blades and the said blades being capable of substantial twisting about their longitudinal mean axes and with respect to their nonrotatable root portions and having torsional resiliency causing them to be restored to their normal shapes after twisting, two similar aerofoil flaps carried respectively by the outer portions of the two blades and angularly movable relative thereto about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative positions of the flaps, relatively movable flap moving connections extending from the flaps to the fuselage and permitting oscillation of the rotor about the said horizontal pivotal axis, and a pilot controlled flap actuating mechanism on the fuselage for utilizing the said connections during rotation of the rotor so as to angularly move the flaps relatively to the blades, the said flap actuating mechanism enabling the pilot to control the movement of the aircraft by reason of varying flap induced twisting of the blades and the resultant varying effective pitches thereof.

6. An aircraft of the rotary blade type including in combination, a fuselage, a power driven substantially vertical shaft connected with the fuselage, a rotor including a blade support connected with the shaft for rotation therewith and for relative pivotal movement about a substantially horizontal axis intersecting the shaft axis and also including two oppositely disposed similar radially extending aerofoil blades secured to the blade support for relative pivotal movement in unison therewith, the said rotor tending to oscillate about the said horizontal axis by reason of the greater lift of the blade moving in the direction of flight, two similar aerofoil flaps carried respectively by the two blades and angularly movable relatively thereto about axes substantially parallel with the mean axes of the blades, relatively movable flap moving connections connected with the flaps and permitting the said oscillation of the rotor about the said horizontal pivotal axis, and means engaging the flap moving connections and acting automatically to oscillate the flaps relatively to the blades during each rotation of the rotor which means is timed to move the flaps in such a manner that the oscillations thereof oppose the tendency of the rotor to oscillate.

7. An aircraft of the rotary blade type including in combination, a fuselage, a power driven substantially vertical shaft connected with the fuselage, a rotor including a blade support connected with the shaft for rotation therewith and for relative pivotal movement about a substantially horizontal axis intersecting the shaft axis and also including two oppositely disposed similar radially extending aerofoil blades secured to the blade support for relative pivotal movement in unison therewith, the said rotor tending to oscillate about the said horizontal axis by reason of the greater lift of the blade moving in the direction of flight and portions of the said blades being angularly adjustable about axes substantially parallel with the mean axes of the blades to change the effective blade pitches, two similar aerofoil flaps carried respectively by the two blades and angularly movable relatively thereto about axes extending longitudinally of the blades which flaps serve by reason of aerodynamic forces acting thereon during rotation to change the effective blade pitches to varying substantial extents dependent on varying relative angular positions of the flaps, relatively movable flap moving connections connected with the flaps and permitting the said oscillation of the rotor about the said horizontal pivotal axis, and means engaging the flap moving connections and acting automatically to oscillate the flaps during each rotation of the rotor and to thereby change the effective blade pitches during each rotation which means is timed to move the flaps and change the blade pitches in such a manner that the changing blade pitches oppose the tendency of the rotor to oscillate.

8. An aircraft of the rotary blade type including in combination, a fuselage, a power driven substantially vertical shaft connected with the fuselage, a rotor including a blade support connected with the shaft for rotation therewith and for relative pivotal movement about a substantially horizontal axis intersecting the shaft axis and also including two oppositely disposed similar radially extending aerofoil blades secured to the blade support for relative pivotal movement in unison therewith, the said rotor tending to oscillate about the said horizontal axis by reason of the greater lift of the blade moving in the direction of flight and the said blades having their root portions so held as to prevent rotative movement thereof about axes extending longitudinally of the blades and the said blades being capable of substantial twisting about their longitudinal mean axes and with respect to their nonrotatable root portions and having torsional resiliency causing them to be restored to their normal shapes after twisting, two similar aerofoil flaps carried respectively by the outer portions of the two blades and angularly movable relatively thereto about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extends dependent on varying relative angular positions of the flaps, relatively movable flap moving connections extending from the flaps to the fuselage and permitting the said oscillation of the rotor about the said horizontal pivotal axis, a pilot controlled flap actuating mechanism on the fuselage for moving the said connections during rotation of the rotor so as to angularly move the flaps relatively to the blades, the said flap actuating mechanism enabling the pilot to control the movement of the helicopter by reason of varying flap induced twisting of the blades and the resultant varying effective pitches thereof, and means engaging the flap adjusting connections and acting automatically to oscillate the flaps during each rotation of the rotor supplementally to the aforesaid pilot controlled movements thereof and to thereby change the effective blade pitches during each rotation of the rotor which means is timed to move the flaps and change the blade pitches in such a manner that the changing blade pitches oppose the tendency of the rotor to oscillate.

9. A helicopter including in combination, a fuselage, two similar substantially vertical shafts extending upward from the fuselage and spaced apart horizontally, the said shafts being connected for rotation in unison and in opposite directions, a plurality of similar radially extending aerofoil blades on each shaft equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades on each shaft and angularly movable relatively to the said blades about axes substantially parallel with the mean axes of the blades which flaps serve by reason of aerodynamic forces acting thereon during rotation to twist the respective blades progressively from the said root portions to the said flaps and to thereby change the effective blade pitches to varying substantial extents dependent on varying relative angular positions of the flaps, two sets of relatively movable flap moving connections extending to the fuselage from the flaps on the blades on the respective shafts, and a pilot controlled flap actuating mechanism on the fuselage for uniformly moving the said connections of both sets during rotation of the blades and flaps so as to angularly move the flaps relatively to the blades, the said flap actuating mechanism enabling the pilot to control the movement of the helicopter by reason of varying flap induced twisting of all of the blades and the resultant varying effective pitches thereof.

10. A helicopter as set forth in claim 9, wherein means is included in the flap actuating mechanism for effecting the movement of the flaps on the blades on one shaft to extents differing from the extents of movement of the flaps on the blades on the other shaft.

11. A helicopter including in combination, a fuselage, two similar substantially vertical shafts extending upward from the fuselage and spaced apart transversely, the said shafts being connected for rotation in unison and in opposite directions, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, and a plurality of similar aerofoil flaps carried respectively by the outer portions of the blades on each shaft and substantially spaced transversely from the said longitudinal mean axes which flaps normally serve by reason of aerodynamic forces acting thereon during rotation to twist the respective blades progressively from the said root portions to the said flaps and to thereby increase the effective blade pitches, the said flaps on the blades on each shaft acting automatically to cause a decrease in the pitches of their blades as the blades move relatively upwardly due to pendular motion of the helicopter about a longitudinal axis and the said flaps on the blades on each shaft acting automatically to cause an increase in the pitches of their blades as the blades move relatively downwardly due to the said pendular motion.

12. A helicopter including in combination, a fuselage, two similar substantially vertical shafts extending upward from the fuselage and spaced apart transversely, the said shafts being connected for rotation in unison and in opposite directions, a plurality of similar radially extending aerofoil blades equally spaced circumferentially and having their root portions connected with the shaft for rotation therewith and so held as to prevent rotative movements of the said root portions about axes extending longitudinally of the blades, each blade being capable of substantial twisting about its longitudinal mean axis and with respect to its nonrotatable root portion and having torsional resiliency causing it to be restored to its normal shape after such twisting, a plurality of similar aerofoil flaps carried respectively by the outer portions of the blades on each shaft and substantially spaced transversely from the said longitudinal mean axes which flaps are angularly movable with respect to the blades about axes substantially parallel with and transversely spaced from the said mean axes and normally serve by reason of aerodynamic forces acting thereon during rotation to twist the respective blades progressively from the said root portions to the said flaps and to thereby increase the effective blade pitches to varying substantial extents dependent on varying relative angular positions of the flaps, the said flaps on the blades on each shaft acting automatically to cause a decrease in the pitches of their blades as the blades move relatively upwardly due to pendular motion of the helicopter about a longitudinal axis and the said flaps on the blades on each shaft acting automatically to cause an increase in the pitches of their blades as the blades move relatively downwardly due to the said pendular motion, two sets of relatively movable flap moving connections extending to the fuselage from the flaps on the blades on the respective shafts, and a pilot controlled flap actuating mechanism on the fuselage for uniformly moving the said connections of both sets during rotation of the blades and flaps so as to angularly move the flaps relatively to the blades, the said flap actuating mechanism enabling the pilot to control the movement of the helicopter by reason of varying flap induced twisting of all of the blades and the resultant varying effective pitches thereof.

CHARLES H. KAMAN.

REFERENCES CITED

The following references are of record in the file of this patent:

UNITED STATES PATENTS

| Number | Name | Date |
| --- | --- | --- |
| 1,210,376 | James | Dec. 26, 1916 |
| 1,279,127 | Lake | Sept. 17, 1918 |
| 1,836,406 | Smith | Dec. 15, 1931 |
| 1,839,194 | Blondin | Jan. 5, 1932 |
| 1,917,965 | Gerhardt | July 11, 1933 |
| 1,960,141 | D'Ascanio | May 22, 1934 |
| 2,024,853 | Gaines | Dec. 17, 1935 |
| 2,025,561 | Wilford | Dec. 24, 1935 |
| 2,271,226 | Johnson | Jan. 27, 1942 |
| 2,363,550 | Reichert | Nov. 28, 1944 |
| 2,371,687 | Gerhardt | Mar. 20, 1945 |
| 2,420,823 | Hays | May 20, 1947 |

FOREIGN PATENTS

| Number | Country | Date |
| --- | --- | --- |
| 672,424 | Germany | Mar. 2, 1939 |
| 802,610 | France | June 13, 1936 |